(12) United States Patent
Park et al.

(10) Patent No.: US 12,000,617 B2
(45) Date of Patent: Jun. 4, 2024

(54) AIR CLEANER

(71) Applicant: Samsung Electronics Co., Ltd., Suwon-si (KR)

(72) Inventors: Hyun Uk Park, Suwon-si (KR); Ji Won Ryu, Suwon-si (KR); Tae-In Eom, Suwon-si (KR); Ju Young Kim, Suwon-si (KR); Moon Sun Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 17/288,862

(22) PCT Filed: Aug. 16, 2019

(86) PCT No.: PCT/KR2019/010406
§ 371 (c)(1),
(2) Date: Apr. 26, 2021

(87) PCT Pub. No.: WO2020/111447
PCT Pub. Date: Jun. 4, 2020

(65) Prior Publication Data
US 2022/0003453 A1 Jan. 6, 2022

(30) Foreign Application Priority Data
Nov. 26, 2018 (KR) .......................... 10-2018-0147262

(51) Int. Cl.
*F24F 13/20* (2006.01)
*B01D 46/00* (2022.01)
(Continued)

(52) U.S. Cl.
CPC ................ *F24F 13/20* (2013.01); *F16B 2/20* (2013.01); *F24F 8/80* (2021.01); *B01D 46/0004* (2013.01); *B01D 2265/02* (2013.01); *F24F 8/10* (2021.01)

(58) Field of Classification Search
CPC ........ F24F 13/20; F16B 2/20; B01D 46/0004; B01D 2265/02
(Continued)

(56) References Cited

U.S. PATENT DOCUMENTS

| 5,403,064 A | 4/1995 | Mahler et al. |
| 8,387,963 B2 * | 3/2013 | Moutafis .................. F16B 2/18 81/367 |
| 2004/0046411 A1 | 3/2004 | Beaver et al. |

FOREIGN PATENT DOCUMENTS

| CN | 101858025 A * | 10/2010 |
| KR | 1998-022321 A | 7/1998 |

(Continued)

OTHER PUBLICATIONS

International Search Report dated Dec. 24, 2019 in connection with International Patent Application No. PCT/KR2019/010406, 2 pages.
(Continued)

*Primary Examiner* — Allen R. B. Schult (57) ABSTRACT

The present disclosure relates to an air cleaner with an improved locking structure. The air cleaner includes a cabinet, a panel having a plurality of holes for discharging air to the front of the cabinet and detachably mounted on the cabinet, and a locking device to detachably connect the cabinet and the panel, wherein the locking device includes a first locking member disposed on the panel, and a second locking member disposed in the cabinet to lock or unlock the first locking member by being rotated by pressing of the first locking member.

6 Claims, 10 Drawing Sheets

(51) Int. Cl.
  *F16B 2/20*   (2006.01)
  *F24F 8/10*   (2021.01)
  *F24F 8/80*   (2021.01)

(58) Field of Classification Search
  USPC ........................................................ 454/230
  See application file for complete search history.

(56) References Cited

FOREIGN PATENT DOCUMENTS

| | | |
|---|---|---|
| KR | 20-0136629 Y1 | 5/1999 |
| KR | 20-0178072 Y1 | 4/2000 |
| KR | 10-2002-0006995 A | 1/2002 |
| KR | 20-0337081 Y1 | 12/2003 |
| KR | 10-0551843 B1 | 2/2006 |
| KR | 20-2009-0000618 U | 1/2009 |
| KR | 10-1166204 B1 | 7/2012 |
| KR | 10-1310179 B1 | 9/2013 |

OTHER PUBLICATIONS

Notice of Preliminary Rejection dated Jul. 20, 2023, in connection with Korean Application No. 10-2018-0147262, 14 pages.

* cited by examiner

AIR CLEANER

CROSS-REFERENCE TO RELATED APPLICATIONS

This application is a 371 of International Application No. PCT/KR2019/010406 filed on Aug. 16, 2019, which claims priority to Korean Patent Application No. 10-2018-0147262 filed on Nov. 26, 2018, the disclosures of which are herein incorporated by reference in their entirety.

BACKGROUND

1. Field

The present disclosure relates to an air cleaner, and more particularly, to an air cleaner with an improved locking structure.

2. Description of Related Art

An air cleaner is a device that is used to remove contaminants contained in air. The air cleaner may remove bacteria, viruses, mold, and fine dust that exist in the sucked air, and chemical substances that cause odors.

The air cleaner may include a filter for purifying contaminated indoor air. Contaminants in air is removed while the air sucked into the air cleaner passes through the filter, so that purified air may be discharged to the outside of the air cleaner.

The air cleaner is configured such that a panel may be disassembled and assembled to replace and clean the filter.

In general, the panel may be provided on a front surface of a cabinet. The panel has a structure such as a locking protrusion and a magnet to be fixed to a cabinet. However, in a structure such as a locking protrusion and a magnet, the panel may not be fixed in place, and the panel may be less closed.

The present disclosure is directed to providing an air cleaner with an improved locking structure.

The present disclosure is directed to providing an air cleaner with an improved locking structure capable of preventing less closing of a panel.

The present disclosure is directed to providing an air cleaner capable of improving appearance quality and product reliability.

SUMMARY

An aspect of the present disclosure provides an air cleaner including a cabinet, a panel mounted on the cabinet, and a locking device configured to detachably connect the cabinet and the panel, wherein the locking device includes a first locking member disposed on the panel, and a second locking member disposed in the cabinet and configured to lock or unlock the first locking member by being rotated by pressing of the first locking member.

The locking device may further include an elastic member provided in the cabinet to elastically support the second locking member.

The locking device may further include a switch turned on or off by rotation of the second locking member.

The second locking member may include a locking body rotatably installed in the cabinet, and a catcher part provided on the locking body to lock or unlock the first locking member.

The catcher part may include a first catcher in contact with the first locking member, and a second catcher disposed to be spaced apart from the first catcher and coupled to the first locking member.

The first locking member may include a locking hole to which the second catcher is coupled.

The elastic member may include a first support portion connected to the cabinet and a second support portion connected to the second locking member, and the direction of a force may be changed by the second support portion when the second locking member is rotated.

The second locking member may be moved to at least one of a first position and a second position rotated from the first position by the pressing of the first locking member.

The elastic member may elastically support the second locking member in a first direction R1 when the second locking member is in the first position, and may elastically support the second locking member in a direction opposite to the first direction when the second locking member is in the second position.

The air cleaner may further include a stopper to restrict the rotation of the second locking member.

The second locking member may include a switch contact portion provided to come into contact with the switch to turn the switch on or off.

Another aspect of the present disclosure provides an air cleaner including a cabinet, a panel detachably mounted on the cabinet, and a locking device configured to detachably connect the cabinet and the panel, wherein the locking device includes a first locking member disposed on the panel, a second locking member disposed in the cabinet to lock or unlock the first locking member by being rotated by pressing of the first locking member, and an elastic member provided in the cabinet to elastically support the second locking member.

The locking device may further include a switch turned on or off by rotation of the second locking member.

The second locking member may include a locking body rotatably installed in the cabinet, and a catcher part provided on the locking body to lock or unlock the first locking member.

The catcher part may include a first catcher in contact with the first locking member, and a second catcher disposed to be spaced apart from the first catcher and coupled to the first locking member.

The first locking member may include a locking hole to which the second catcher is coupled.

The elastic member may include a first support portion connected to the cabinet and a second support portion connected to the second locking member, and the direction of a force may be changed by the second support portion when the second locking member is rotated.

The air cleaner may further include a stopper to restrict the rotation of the second locking member.

The second locking member may include a switch contact portion provided to come into contact with the switch to turn the switch on or off.

According to an embodiment of the present disclosure, less closing of a panel can be prevented by an improved locking structure.

Further, according to an embodiment of the present disclosure, appearance quality and product reliability can be improved.

DETAILED DESCRIPTION

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The term "and/or" includes any combination of a plurality of related items or any one of a plurality of related items.

The present disclosure is applicable to a case and all home appliances in which the case is detachably mounted. Hereinafter, an air cleaner will be described as an example Hereinafter, embodiments of the present disclosure will be described in detail with reference to the accompanying drawings.

The terms 'front surface' and 'forward' used in the following refer to a surface viewed forward and a direction toward the front based on an air cleaner 1 illustrated in FIG. 1, and the term 'rearward' refers to a direction toward the rear of the air cleaner 1.

Figure 1:
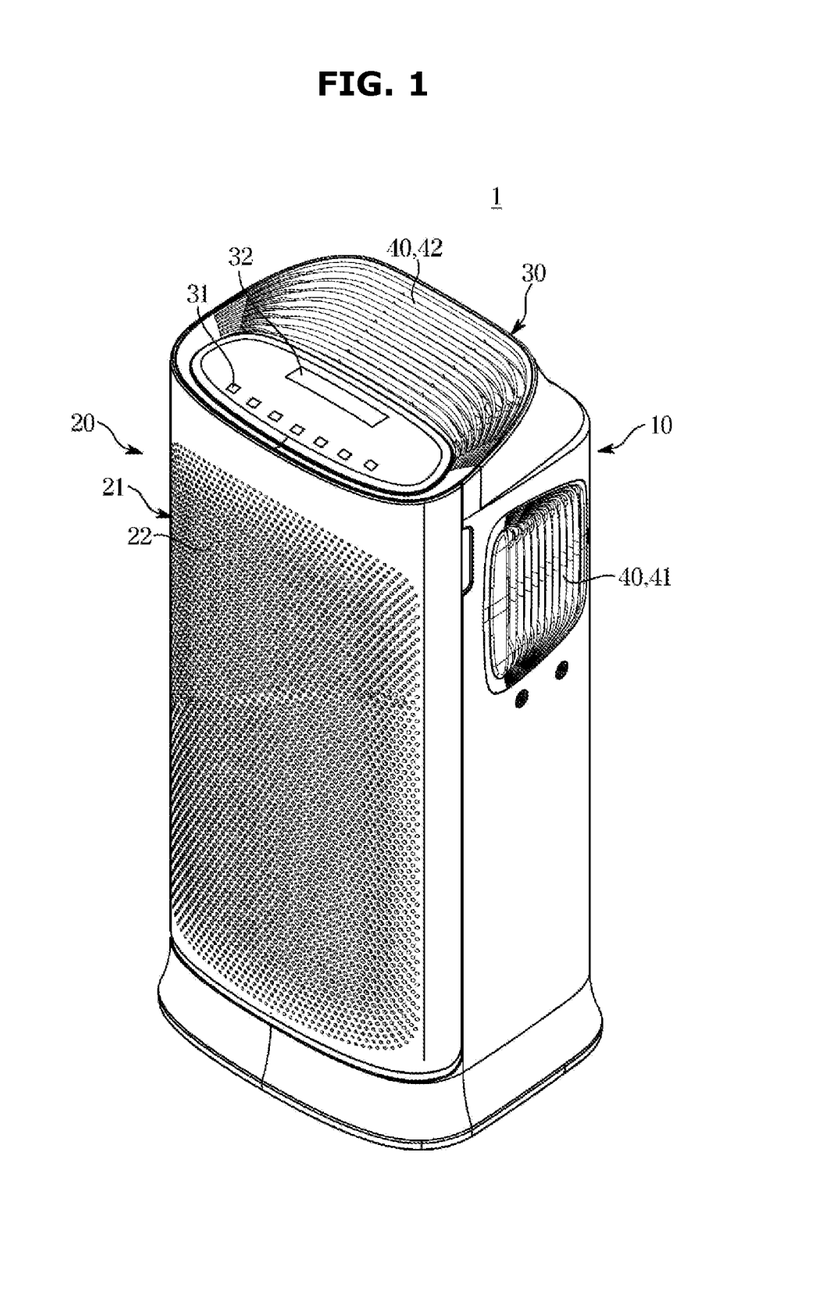
FIG. 1 is a perspective view of an air cleaner according to an embodiment of the present disclosure.
Figure 2:
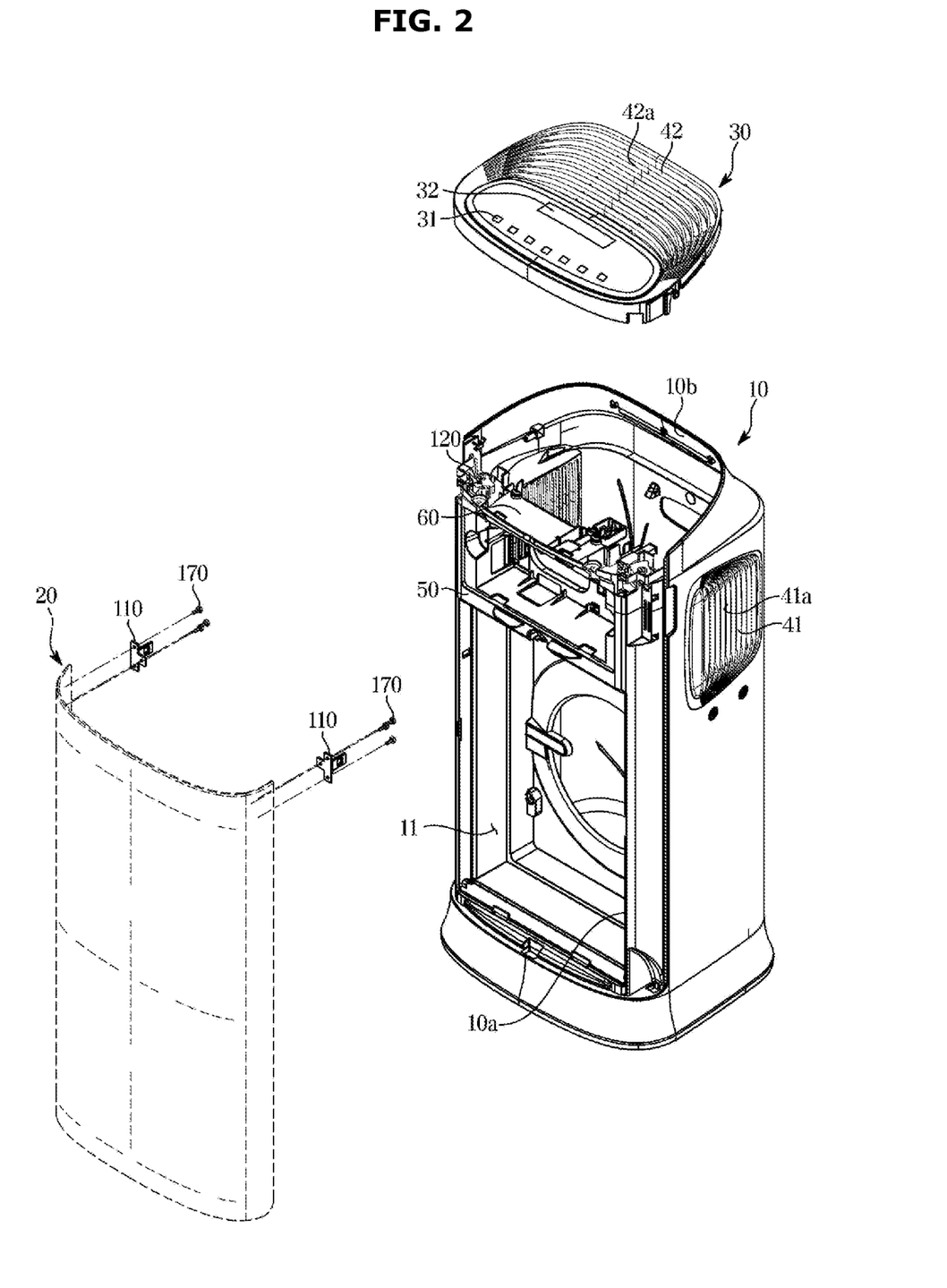
FIG. 2 is an exploded perspective view of the air cleaner according to an embodiment of the present disclosure.

FIG. 1 is a perspective view of an air cleaner according to an embodiment of the present disclosure, and FIG. 2 is an exploded perspective view of the air cleaner according to an embodiment of the present disclosure.

As illustrated in FIGS. 1 and 2, the air cleaner 1 includes a cabinet 10 forming an appearance, and a front panel 20 (hereinafter referred to as 'panel') coupled to the front of the cabinet 10 to form a front surface of the air cleaner 1.

The cabinet 10 may be formed in a rectangular parallelepiped shape with open front and upper sides. A first opening 10a may be formed in the front of the cabinet 10. The panel 20 having a size and shape corresponding to the first opening 10a may be provided in the first opening 10a of the cabinet 10. A second opening 10b may be formed on the upper side of the cabinet 10. A top cover 30 having a size and shape corresponding to the second opening 10b may be provided in the second opening 10b of the cabinet 10. This embodiment illustrates that the cabinet 10 is configured such that opposite side surfaces and a rear surface are formed integrally, but the present disclosure is not limited thereto. For example, the opposite side surfaces and the rear surface may be formed separately. Also, this embodiment illustrates that the cabinet is integrally formed with a base forming a lower surface, but the present disclosure is not limited thereto.

The panel 20 may be formed in a plate shape having a size corresponding to the first opening 10a. The panel 20 may be provided with an air suction portion 21 through which air is introduced from the outside. The air suction portion 21 may include a plurality of suction holes 22 distributed evenly over the entire front surface of the panel 20.

The air suction portion 21 of the panel 20 may be provided such that external air is introduced in a direction from the front of the cabinet 10 toward the inside of the cabinet 10.

Air introduced into the cabinet 10 through the air suction portion 21 of the panel 20 may be discharged to the outside through an air outlet 40.

The air outlet 40 may include a first outlet 41 and a second outlet 42. The first outlet 41 may be formed on the opposite side surfaces of the cabinet 10. The second outlet 42 may be formed on the upper side of the cabinet 10. The second outlet 42 may be formed on the top cover 30.

The top cover 30 is coupled to an upper end of the cabinet 10 to form the upper surface of the air cleaner 1. The top cover 30 may include a button 31 to input the operation of the air cleaner 1, and a display 32 to display operating states.

On the air outlet 40, exhaust grills 41a and 42a may be provided to adjust the amount of air discharged from the inside of the cabinet 10 to the outside. The discharge grills 41a and 42a may include the first discharge grill 41a provided on the first outlet 41 and the second discharge grill 42a provided on the second outlet 42. An embodiment of the present disclosure illustrates that the discharge grill is formed in a streamlined blade shape of being inclined toward the front, but the present disclosure is not limited thereto. For example, the discharge grill may be formed in various shapes including a V shape and an H shape.

In the inside of the cabinet 10, a filter member (not shown) to filter out or sterilize dust from the air sucked from the outside of the cabinet 10 to the inside, and a blowing device (not shown) to suck air outside the cabinet 10 into the cabinet 10 or discharge air inside the cabinet 10 to the outside may be provided.

Although not shown, the filter member is mounted inside the cabinet 10 to filter air introduced through the air suction portion 21 of the panel 20.

The filter member may be provided by being selected from a pre-filter, an electrostatic filter of electric dust collection method, a fine dust collection filter in the form of a nonwoven fabric made of polypropylene resin or polyethylene resin, a granular activated carbon filter, and the like, or may be provided by arranging the above filters to form a plurality of layers.

An installation space 11 may be formed inside the cabinet 10 to install the filter member and the blowing device. A frame 50 may be provided inside the cabinet 10 so that the filter member and the blowing device may be accommodated.

The frame 50 may include a support bracket 60 provided on an upper side of the cabinet 10 so that the panel 20 is supported.

A locking device 100 to detachably connect the panel 20 to the cabinet 10 may be provided on the support bracket 60.

Figure 3:
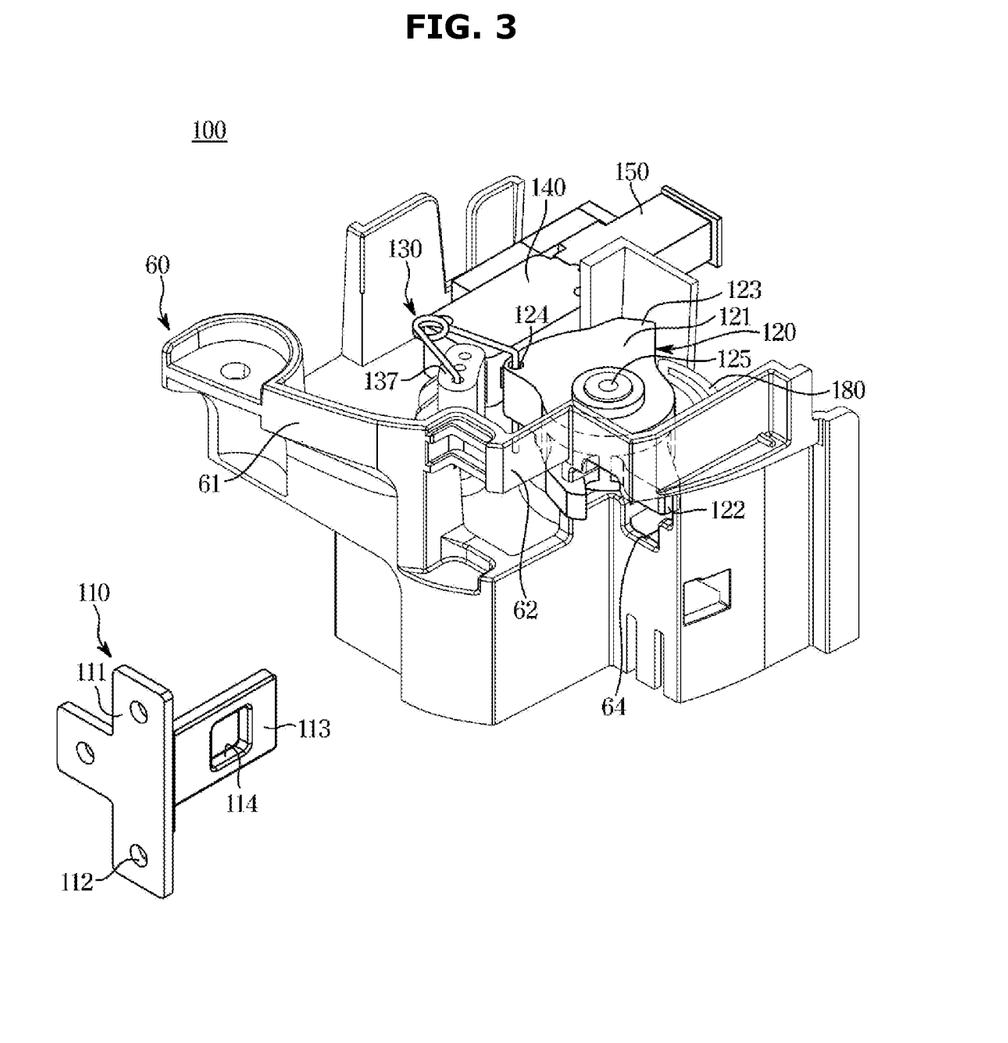
FIG. 3 is a perspective view of a locking device of the air cleaner according to an embodiment of the present disclosure.
Figure 4:
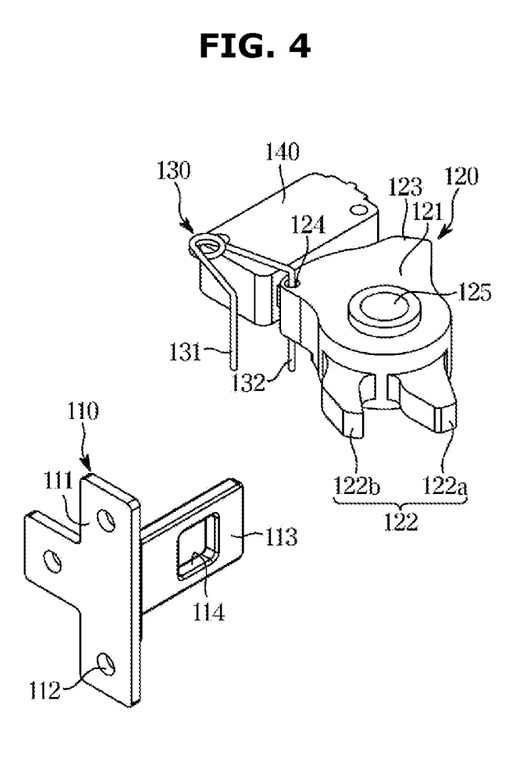
FIG. 4 is a perspective view of a first locking member and a second locking member of the locking device according to an embodiment of the present disclosure.
Figure 5:
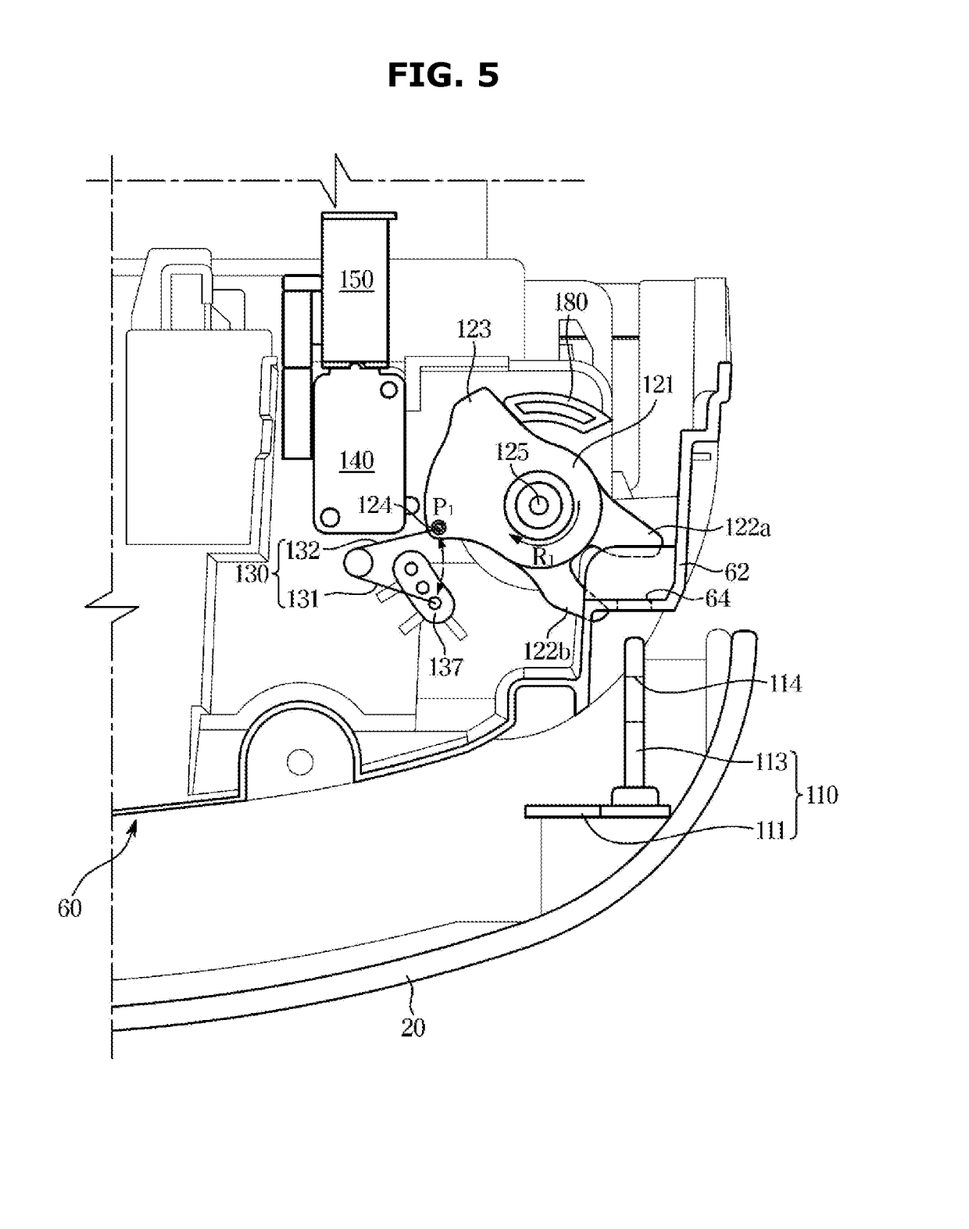
FIGS. 5 and 6 are views illustrating operations of the locking device according to an embodiment of the present disclosure.
Figure 6:
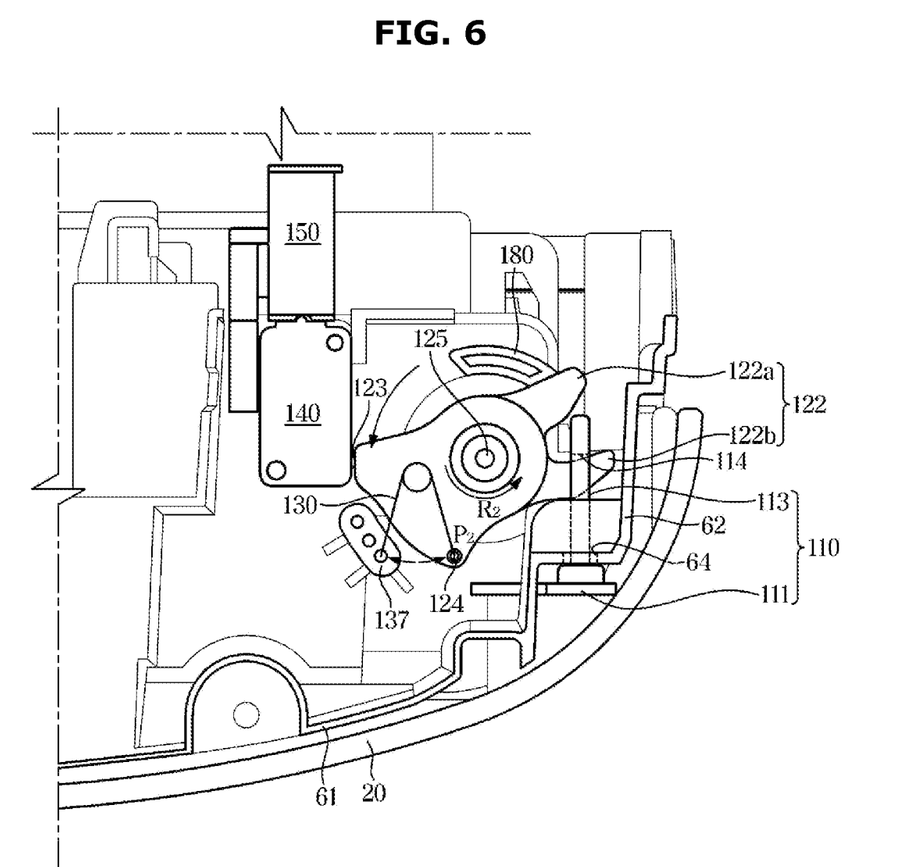

FIG. 3 is a perspective view of a locking device of the air cleaner according to an embodiment of the present disclosure, FIG. 4 is a perspective view of a first locking member and a second locking member of the locking device according to an embodiment of the present disclosure, and FIGS. 5 and 6 are views illustrating operations of the locking device according to an embodiment of the present disclosure.

As illustrated in FIGS. 3 to 6, the locking device 100 of the air cleaner 1 is provided to detachably connect the cabinet 10 and the panel 20.

The locking device 100 may include a first locking member 110 and a second locking member 120 coupled to the first locking member 110.

The first locking member 110 may be disposed on the panel 20. The first locking member 110 may be disposed at an upper end of an inner surface of the panel 20. The first locking members 110 may be disposed in the same shape on upper left and right sides of the panel 20, respectively. Because the first locking members 110 disposed on the left and right sides of the panel 20, respectively, have the same shape and configuration, redundant descriptions may be omitted.

The first locking member 110 includes a first locking bracket 111 provided to be fixed to a rear surface of the panel 20 and a first locking part 113 protruding from the first locking bracket 111.

The first locking bracket 111 may include a first locking member fixing portion 112 to be coupled to the rear surface of the panel 20. The first locking bracket 111 may be formed in a plate shape to correspond to the rear surface of the panel 20. The first locking bracket 111 may have a ']-' shape. The first locking member fixing portion 112 may include a fixing hole. A plurality of the first locking member fixing portion 112 may be provided. The first locking member fixing portions 112 may be disposed at ends of the first locking bracket 111, respectively. The present disclosure illustrates that three of the first locking member fixing portions are formed, but the present disclosure is not limited thereto. The first locking bracket may be formed in various shapes such as straight and square.

The first locking bracket 111 may be fixed to the panel 20 through a fixing member 170 such as a bolt that penetrates through the first locking member fixing portion 112.

The first locking part 113 is formed to extend vertically from the first locking bracket 111. The first locking part 113 is formed to protrude from the first locking bracket 111. The first locking part 113 may include a locking hole 114. The locking hole 114 may be formed by cutting at least a portion of the first locking part 113.

The second locking member 120 may be provided in the cabinet 10. The second locking member 120 may be provided to lock or unlock the first locking member 110 by being rotated by pressing of the first locking member 110. The second locking member 120 may be provided on the support bracket 60 of the cabinet 10. The second locking member 120 may be disposed at the upper end of the cabinet 10. The second locking members 120 may be disposed in the same shape on upper left and right sides of the cabinet 10, respectively. Because the second locking members 120 disposed on the left and right sides of the cabinet 10, respectively, have the same shape and configuration, redundant descriptions may be omitted.

The support bracket 60 of the cabinet 10 may include a first support bracket 61 provided in the front of the cabinet 10 to support the rear surface of the panel 20, and a second support bracket 62 provided by bending both sides of the first support bracket 61 backward. The first support bracket 61 may be provided to be in contact with and support an upper rear surface of the panel 20. The second support bracket 62 may be provided to be in contact with and support both side ends of the panel 20.

The second support bracket 62 may include a first locking member guide 64 provided to guide the movement of the first locking member 110. The first locking member guide 64 may be formed by opening at least a portion of the second support bracket 62. The first locking member guide 64 may be formed by cutting at least a portion of the second support bracket 62 so that the first locking part 113 of the first locking member 110 may be inserted. The first locking member guide 64 may be formed in a size and shape corresponding to the first locking part 113.

The second locking member 120 includes a locking body 121 rotatably installed in the cabinet 10, and a catcher part 122 provided on the locking body 121 to lock or unlock the first locking member 110.

The locking body 121 of the second locking member 120 may be rotatably provided on the support bracket 60 of the cabinet 10. The locking body 121 may be rotatably installed on the support bracket 60 about a rotation shaft 125.

The catcher part 122 may include a first catcher 122a in contact with the first locking member 110, and a second catcher 122b disposed to be spaced apart from the first catcher 122a and coupled to the first locking member 110.

The first catcher 122a may come into contact with the first locking part 113 of the first locking member 110 that is inserted through the first locking member guide 64. At least one surface of the first catcher 122a may be pressed by the first locking part 113 of the first locking member 110.

The first catcher 122a and the locking body 121 are rotated about the rotation shaft 125 by the pressing of the first locking member 110.

The second catcher 122b may be disposed to be spaced apart from the first catcher 122a by a predetermined distance so that the first locking member 110 presses the first catcher 122a. The second catcher 122b may be coupled to the locking hole 114 of the first locking member 110 by rotation of the locking body 121. The first locking member 110 may be fixed to the second locking member 120 by the coupling of the second catcher 122b and the locking hole 114.

Accordingly, the panel 20 may be maintained in a state of being stably fixed to the cabinet 10 by the first locking member 110.

An elastic member 130 may be provided in the cabinet 10. The elastic member 130 may be provided to elastically support the second locking member 120. The locking body 121 of the second locking member 120 may include an elastic member connection portion 124 to which the elastic member 130 is connected. The elastic member 130 may be provided on the support bracket 60 of the cabinet 10. An elastic member installation portion 137 to install the elastic member 130 may be provided on the support bracket 60. One side of the elastic member 130 may be fixed to the locking body 121 and the other side may be fixed to the elastic member installation portion 137. The elastic member 130 may include a first support portion 131 connected to the elastic member installation portion 137, and a second support portion 132 connected to the elastic member connection portion 124. One side of the elastic member 130 may be connected to the support bracket 60 and the other side may be connected to the second locking member 120.

The locking body 121 of the second locking member 120 may be elastically supported by the elastic member 130. The locking body 121 of the second locking member 120 is rotated in a first direction R1 by receiving a force in an open direction of the cabinet 10 by the elastic member 130 in state in which the locking body 121 is not rotated, that is, at a first position P1.

At this time, the rotation of the second locking member 120 is restricted by a stopper 180 installed on the support bracket 60. The stopper 180 may be disposed within a radius of rotation of the second locking member 120. The stopper 180 may be installed on the support bracket 60. The stopper 180 may be provided to support one side of the first catcher 122a so that the first catcher 122a no longer rotates in a second direction R2. The stopper 180 may be provided to support one side of the locking body 121 so that the locking body 121 of the second locking member 120 does not rotate in the first direction R1.

When the panel 20 is closed, the first locking member 110 provided on the rear surface of the panel 20 presses the first catcher 122a of the second locking member 120 by passing through the first locking member guide 64.

When the first locking member 110 presses the first catcher 122a of the second locking member 120, the locking body 121 rotates about the rotation shaft 125. At this time, the second catcher 122b is inserted into the locking hole 114 of the first locking member 110. When the locking body 121 is rotated by a certain angle and positioned at the second position P2, the direction of the force of the elastic member 130 is changed to a closing direction of the cabinet 10, that is, the second direction R2.

The second locking member 120 coupled with the first locking member 110 may stably maintain a closing operation by being elastically supported in the closing direction of the cabinet 10, that is, in the second direction R2.

The locking device 100 may include a switch 140 that is turned on or off by the rotation of the second locking member 120. The switch 140 may be connected by a connector 150. The switch 140 may be provided to be interlocked by rotation of the second locking member 120. The switch 140 may be disposed near the locking body 121 of the second locking member 120. The switch 140 may be disposed on the support bracket 60 on which the second locking member 120 is installed. The switch 140 may be disposed within the radius of rotation of the second locking member 120. The second locking member 120 may include a switch contact portion 123 to come into contact with the switch 140 to turn the switch 140 on or off. The switch contact portion 123 may be formed by protruding at least a portion of the locking body 121.

Figure 7:
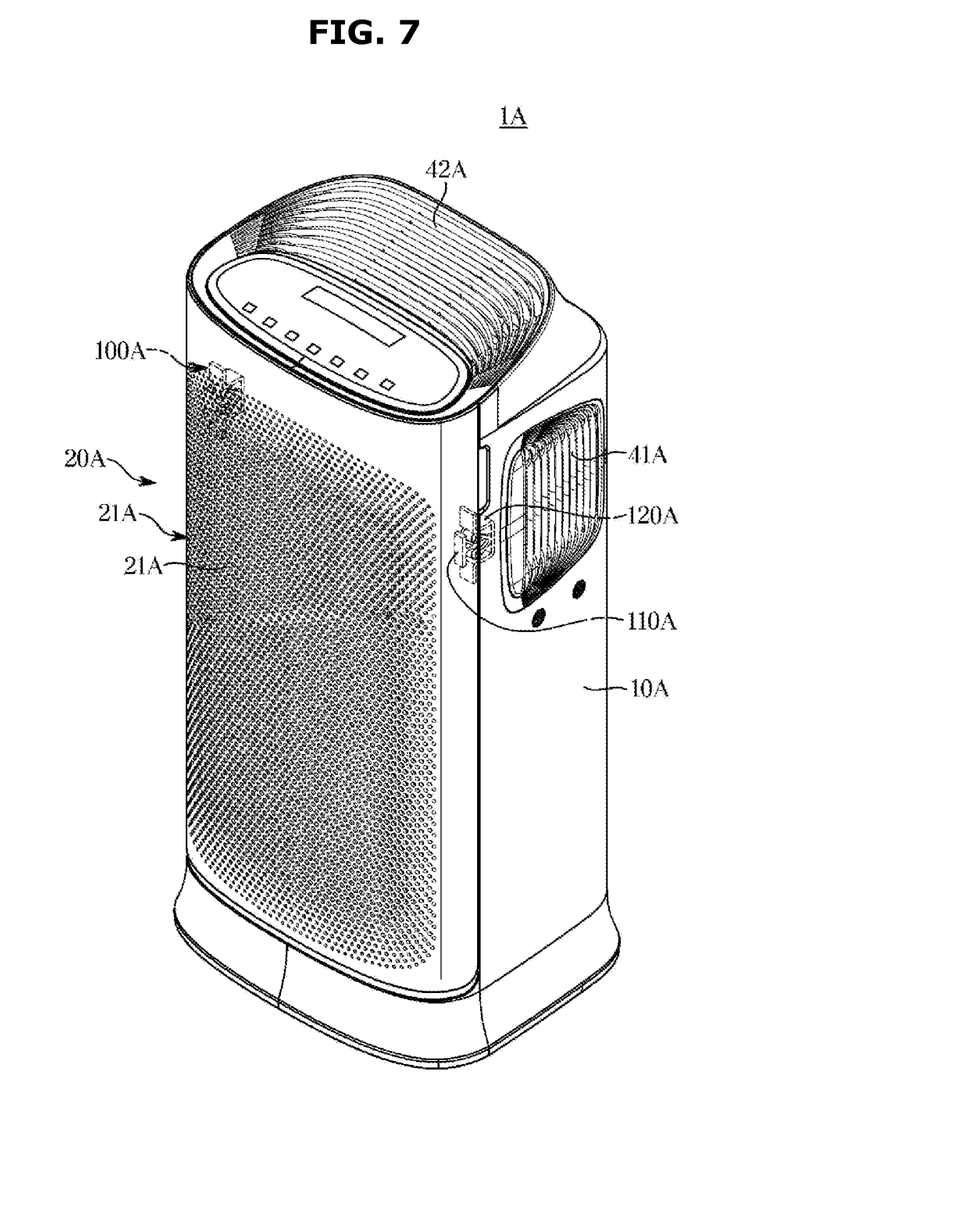
FIG. 7 is a perspective view of an air cleaner in which a locking device according to another embodiment of the present disclosure is mounted.
Figure 8:
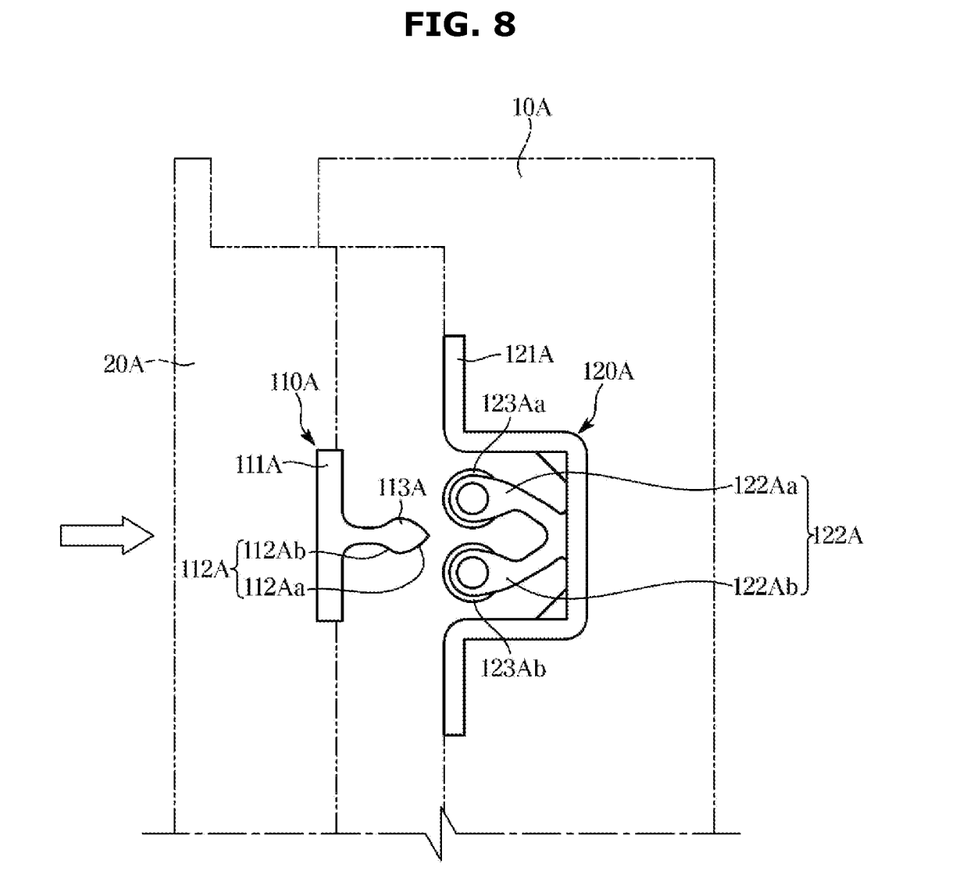
FIGS. 8 to 10 are views illustrating operations of the locking device according to another embodiment of the present disclosure.
Figure 9:
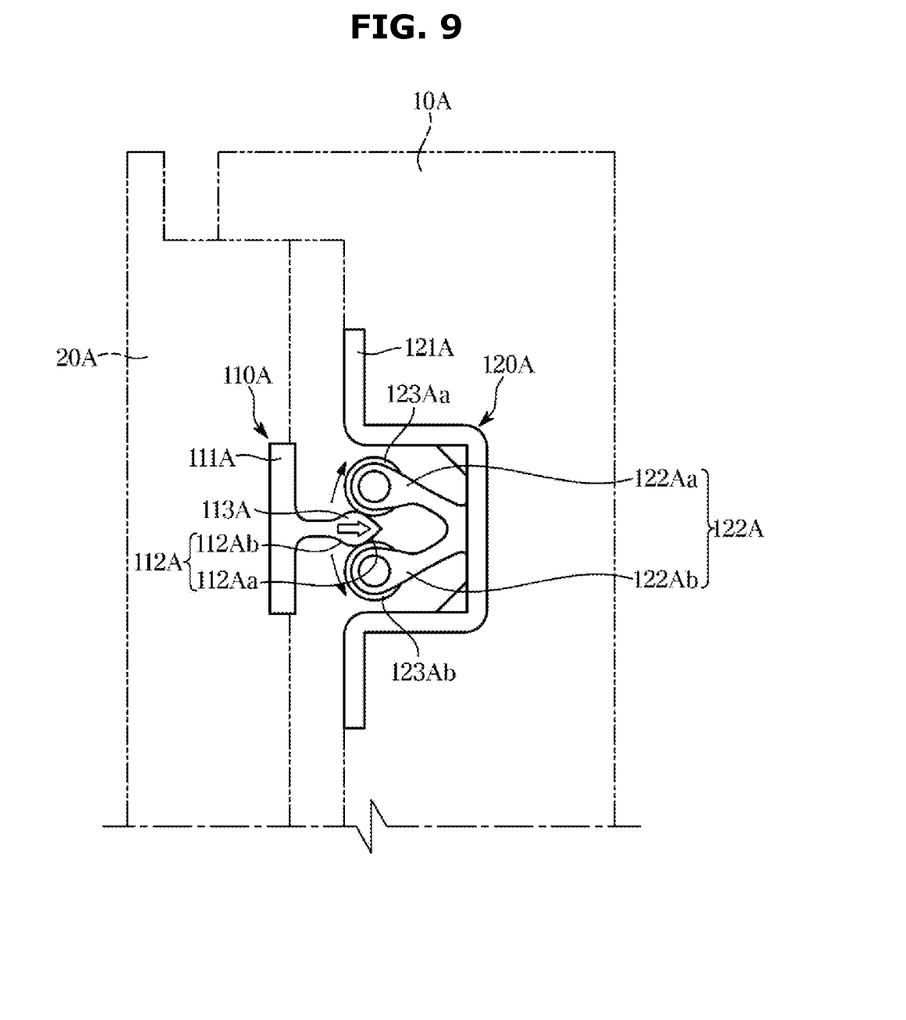
Figure 10:
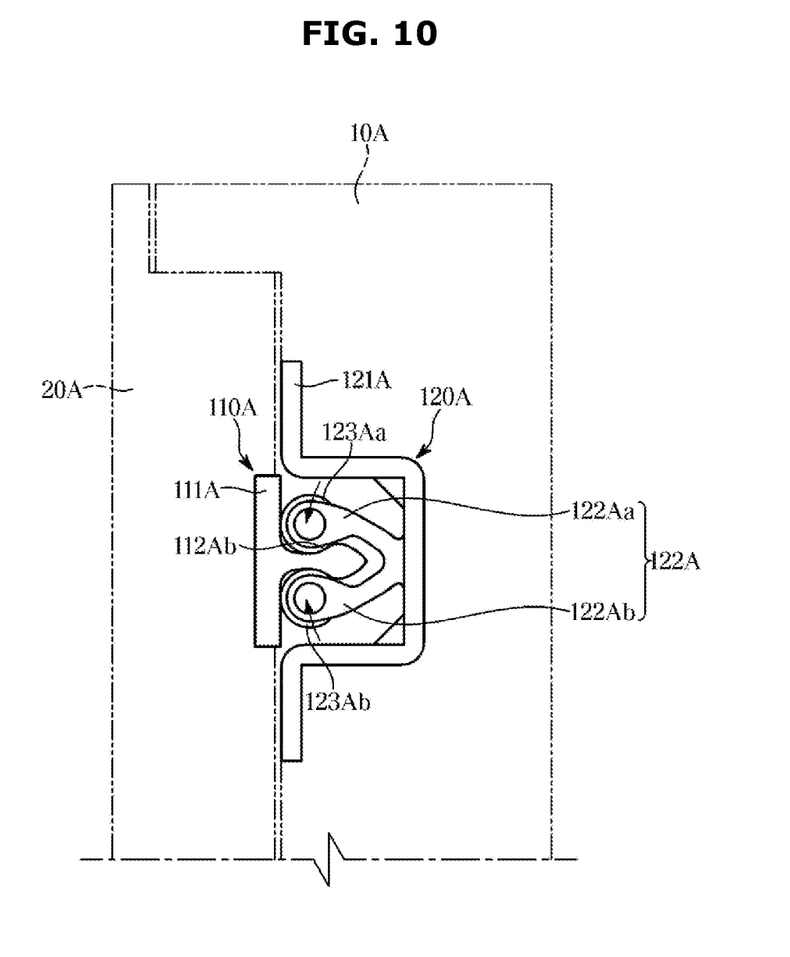

FIG. 7 is a perspective view of an air cleaner in which a locking device according to another embodiment of the present disclosure is mounted, and FIGS. 8 to 10 are views illustrating operations of the locking device according to another embodiment of the present disclosure. Reference numerals that are not indicated refer to FIGS. 1 to 6.

As illustrated in FIGS. 7 to 10, an air cleaner 1A includes a cabinet 10A, a panel 20A installed in the front of the cabinet 10A, and a locking device 100A to detachably connect the cabinet 10A and the panel 20A.

An air suction portion 21A through which air is introduced from the outside may be formed on the panel 20A. The air suction portion 21A may include a plurality of suction holes 22A distributed evenly over the entire front surface of the panel 20.

Air introduced into the cabinet 10A through the air suction portion 21A of the panel 20A may be discharged to the outside through a first outlet 41A disposed on opposite side surfaces of the cabinet 10A and a second outlet 42A disposed on an upper surface of the cabinet 10A.

The locking device 100A may include a first locking member 110A and a second locking member 120A coupled to the first locking member 110A.

The first locking member 110A may be disposed on the panel 20A. The first locking member 110A may be disposed at an upper end of an inner surface of the panel 20A. The first locking members 110A may be disposed in the same shape on left and right sides of the panel 20A, respectively. Because the first locking members 110A disposed on the left and right sides of the panel 20A, respectively, have the same shape and configuration, redundant descriptions may be omitted.

The first locking member 110A includes a first locking bracket 111A provided to be fixed to a rear surface of the panel 20 and a first locking part 113A protruding from the first locking bracket 111A. The first locking part 113A includes an inclined surface 112A on an outer circumferential surface thereof.

The second locking member 120A may be provided in the cabinet 10A. The second locking member 120A may be provided to lock or unlock the first locking member 110A by being elastically supported by pressing of the first locking member 110A.

The second locking member 120A may be disposed at an upper end of the cabinet 10A. The second locking members 120A may be disposed in the same shape on left and right sides of the cabinet 10, respectively. Because the second locking members 120A disposed on the left and right sides of the cabinet 10A, respectively, have the same shape and configuration, redundant descriptions may be omitted.

The second locking member 120A includes a locking bracket 121A installed in the cabinet 10A, and a catcher part 122A provided on the locking bracket 121A to lock or unlock the first locking member 110A.

The catcher part 122A of the second locking member 120A may include a first catcher 122Aa to support one side of a first locking part 123A of the first locking member 110A, and a second catcher 122Ab disposed to be spaced apart from the first catcher 122Aa and supported on the other side of the first locking part 123A of the first locking member 110A.

The first catcher 122Aa and the second catcher 122Ab may be disposed to face each other and may be provided to be elastically supported. The first catcher 122Aa and the second catcher 122Ab may include a first roller 123Aa and a second roller 123Ab, respectively.

The first catcher 122Aa and the second catcher 122Ab may elastically support the first locking part 113A of the first locking member 110A.

The first roller 123Aa of the first catcher 122Aa and the second roller 123Ab of the second catcher 122Ab slide along the inclined surface 112A of the first locking part 113A.

The inclined surface 112A of the first locking part 123A may include a first inclined portion 112Aa formed on a front portion thereof and a second inclined portion 112Ab formed on a rear portion thereof.

When the panel 20A is closed in a state in which the cabinet 10A is open, the first inclined portion 112Aa of the first locking part 113A of the first locking member 110A is fixed between the first catcher 122Aa and the second catcher 122Ab by sliding through the first roller 123Aa and the second roller 123Ab.

In the closed state of the cabinet 10A, the second inclined portion 112Ab of the first locking part 113A of the first locking member 110A is elastically supported by the first catcher 122Aa and the second catcher 122Ab.

Accordingly, elastic forces of the first catcher 122Aa and the second catcher 122Ab may act in a direction of closing the panel 20A along the second inclined portion 112Ab to elastically support the first locking member 110A so that the panel 20A is maintained in the closing state.

The foregoing has illustrated and described specific embodiments. However, it should be understood by those of skilled in the art that the disclosure is not limited to the above-described embodiments, and various changes and modifications may be made without departing from the technical idea of the disclosure described in the following claims.

The invention claimed is:

1. An air cleaner comprising:
   a cabinet;
   a panel mounted on the cabinet; and
   a locking device configured to detachably connect the cabinet and the panel,
   wherein the locking device comprises:
      a first locking member disposed on the panel; and
      a second locking member disposed in the cabinet and configured to lock or unlock the first locking member by being rotated by pressing of the first locking member,
   an elastic member provided in the cabinet to elastically support the second locking member, wherein the elastic member elastically supports the second locking member in a first direction when the second locking member is in a first position, and elastically supports the second locking member in a direction opposite to the first direction when the second locking member is in a second position rotated from the first position,
   wherein the second locking member comprises:
      a locking body rotatably installed in the cabinet;
      a first catcher in contact with the first locking member; and
      a second catcher disposed to be spaced apart from the first catcher and coupled to the first locking member, and
   wherein the first locking member comprises a locking hole into which the second catcher is insertable.

2. The air cleaner according to claim 1, wherein the locking device further comprises a switch turned on or off by rotation of the second locking member.

3. The air cleaner according to claim 1, wherein the elastic member comprises a first support portion connected to the cabinet and a second support portion connected to the second locking member, and
a direction of a force is changed by the second support portion when the second locking member is rotated.

4. The air cleaner according to claim 1, wherein the second locking member is moved to at least one of the first position and the second position rotated from the first position by the pressing of the first locking member.

5. The air cleaner according to claim 1, further comprising:
a stopper to restrict the rotation of the second locking member.

6. The air cleaner according to claim 2, wherein the second locking member comprises a switch contact portion provided to come into contact with the switch to turn the switch on or off.

* * * * *